US008950985B2

(12) United States Patent
Durand-Terrasson

(10) Patent No.: US 8,950,985 B2
(45) Date of Patent: Feb. 10, 2015

(54) ROTATING TOOL

(75) Inventor: Alain Durand-Terrasson, Doissin (FR)

(73) Assignee: Seco Tools AB, Fagersts (SE)

( * ) Notice: Subject to any disclaimer, the term of this patent is extended or adjusted under 35 U.S.C. 154(b) by 348 days.

(21) Appl. No.: 13/202,793

(22) PCT Filed: Feb. 26, 2010

(86) PCT No.: PCT/SE2010/050224
§ 371 (c)(1),
(2), (4) Date: Sep. 9, 2011

(87) PCT Pub. No.: WO2010/101513
PCT Pub. Date: Sep. 10, 2010

(65) Prior Publication Data
US 2012/0251254 A1   Oct. 4, 2012

(30) Foreign Application Priority Data

Mar. 3, 2009   (SE) ........................................ 0950110

(51) Int. Cl.
*B23B 29/02* (2006.01)
*B23D 77/04* (2006.01)
*B23B 41/02* (2006.01)
*B23D 77/00* (2006.01)

(52) U.S. Cl.
CPC ............... *B23D 77/04* (2013.01); *B23B 29/02* (2013.01); *B23B 41/02* (2013.01); *B23D 77/006* (2013.01); *B23D 2277/02* (2013.01); *B23D 2277/2471* (2013.01); *B23D 2277/46* (2013.01); *Y10S 408/713* (2013.01)
USPC ............................ 408/227; 408/713; 408/186

(58) Field of Classification Search
USPC ......... 408/227, 713, 186, 188, 197, 198, 200, 408/150, 164; 606/79, 80; 407/51, 59, 37, 407/45; 144/92, 93.1, 93.2, 96–100, 103, 144/106, 108, 219, 220, 230, 234, 235
See application file for complete search history.

(56) References Cited

U.S. PATENT DOCUMENTS 314,086 A * 3/1885 Waas .............................. 144/24
552,065 A * 12/1895 King ............................ 408/200
(Continued)

FOREIGN PATENT DOCUMENTS

CN   201067809 Y   6/2008
EP   0181625 A2 * 5/1986 .............. B23B 31/08
(Continued)

OTHER PUBLICATIONS

European Search Report (Aug. 30, 2012) for corresponding European App. EP 10 749 011 2.
(Continued)

*Primary Examiner* — Eric A Gates
*Assistant Examiner* — Ryan Rufo
(74) *Attorney, Agent, or Firm* — WRB-IP LLP

(57) ABSTRACT

A rotating tool includes a plurality of elongated members, a cutting edge extending from at least one of the elongated members. A support is attached to each of the elongated members for holding the elongated members at a distance relative to an axis of rotation of the tool. A guiding pad extends radially outwardly from the axis relative to at least one of the elongated members. The tool is particularly useful for reaming operations in which it can be useful to have a tool with a large diameter and/or length.

10 Claims, 2 Drawing Sheets

(56) References Cited

U.S. PATENT DOCUMENTS

| | | | | |
|---|---|---|---|---|
| 874,027 A * | 12/1907 | Nelson | | 408/198 |
| 1,101,471 A * | 6/1914 | Schaff | | 408/164 |
| 1,831,371 A | 10/1931 | Smith | | |
| 2,121,888 A * | 6/1938 | Smith | | 175/280 |
| 2,280,295 A * | 4/1942 | Manteros | | 144/233 |
| 2,372,219 A * | 3/1945 | Miller | | 408/59 |
| 2,403,546 A * | 7/1946 | Olsen | | 451/481 |
| 2,765,529 A * | 10/1956 | Bolender | | 29/558 |
| 3,016,073 A * | 1/1962 | Broussard et al. | | 408/85 |
| 3,865,502 A * | 2/1975 | Hamann | | 408/226 |
| 4,029,428 A * | 6/1977 | Levens | | 408/127 |
| 4,053,249 A * | 10/1977 | Ness et al. | | 408/1 BD |
| 4,706,659 A * | 11/1987 | Matthews et al. | | 606/80 |
| 4,980,996 A * | 1/1991 | Klink et al. | | 451/51 |
| 5,425,604 A * | 6/1995 | Scheer et al. | | 408/83 |
| 6,168,599 B1 * | 1/2001 | Frieze et al. | | 606/80 |
| 6,830,502 B2 * | 12/2004 | Buettiker et al. | | 451/41 |
| 7,810,531 B2 * | 10/2010 | Labbe | | 144/231 |
| 7,887,265 B2 * | 2/2011 | Hecht | | 407/37 |
| 8,070,401 B2 * | 12/2011 | Demarest et al. | | 409/259 |
| 2004/0096283 A1 * | 5/2004 | Nomura | | 408/59 |
| 2006/0140730 A1 * | 6/2006 | Schlagenhauf et al. | | 407/37 |
| 2008/0240872 A1 * | 10/2008 | Rimet | | 407/51 |
| 2008/0318747 A1 * | 12/2008 | Phely | | 492/4 |
| 2010/0054874 A1 * | 3/2010 | Azzopardi | | 407/45 |
| 2010/0129170 A1 * | 5/2010 | Wilmot | | 409/143 |
| 2012/0219369 A1 * | 8/2012 | Kress | | 407/45 |

FOREIGN PATENT DOCUMENTS

| | | |
|---|---|---|
| EP | 1864738 A1 | 12/2007 |
| GB | 1342567 A | 1/1974 |
| JP | H0428903 U | 3/1992 |
| SU | 456684 C1 | 1/1975 |

OTHER PUBLICATIONS

International Search Report for corresponding International Application PCT/SE2010/050224.

Russian Official Action (Mar. 24, 2014) for corresponding Russian App. 2011139948/02.

* cited by examiner

ROTATING TOOL

BACKGROUND AND SUMMARY

The present invention relates to rotating tools for metal removing machining and, more particularly, to rotating tools comprising a plurality of elongated members.

In rotating tools such as reaming tools, it is often necessary to use tools having large diameters and/or lengths. Often, the tools have bodies made of cast iron or other heavy materials. Conventional tools can be too heavy for some machine spindles. While it is possible to make the tools out of material with relatively light weight, such as aluminum, aluminum can be difficult to machine.

It is desirable to provide a solution to the above-mentioned drawback.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
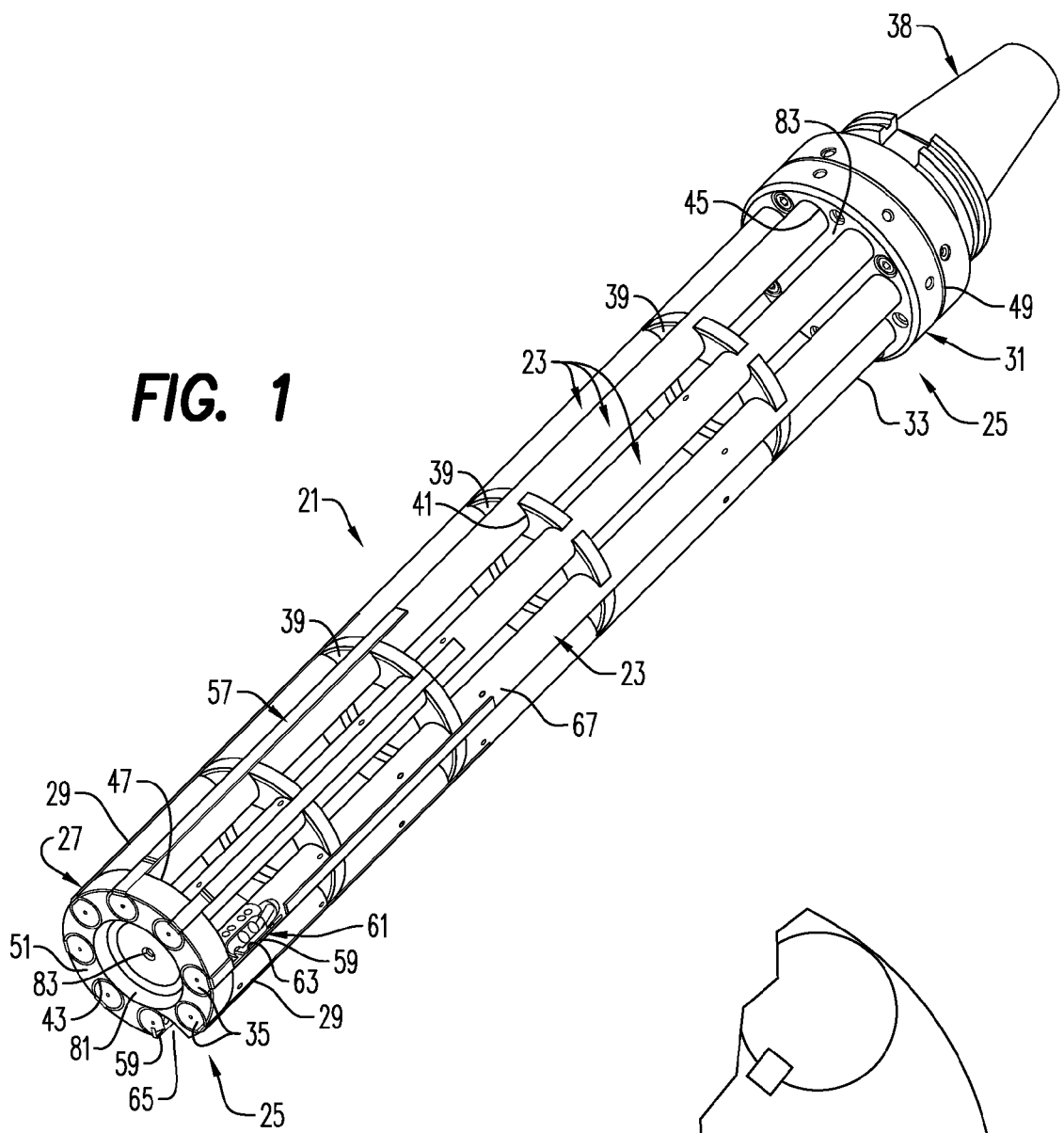
FIG. 1 is a perspective view of a rotating tool according to an embodiment of the present invention.

A tool 21 is shown in FIG. 1 and is particularly adapted for use as a reaming tool, although the basic concept is applicable to other types of rotating tools, such as drills, boring tools, milling tools and the like. The tool 21 comprises a plurality of elongated members 23 and a support 25 for holding the elongated members relative to an axis of rotation A of the tool. The elongated members 23 are typically steel or carbon fiber roads, usually generally circular in cross-section, of sufficient stiffness to avoid problems with torsional deflection of the tool due to bending of the elongated members. The physical characteristics of the elongated members can be dependent upon the application for which the tool will be used. The quantity of elongated members can also vary depending upon the application for which the tool will be used.

The support 25 can comprise a first disk 27 to which first ends 29 of the plurality of elongated members 23 are attached and a second disk 31 to which second ends 33 of the plurality of elongated members are attached. While tips 35 and 37 of the first ends 29 and second ends 33, respectively, of the plurality of elongated members 23 can extend beyond outer surfaces of the first and second disks 27 and 31, ordinarily, the tips of the first ends and second ends of the elongated members will be recessed relative to or flush with the outer surfaces.

Figure 2:
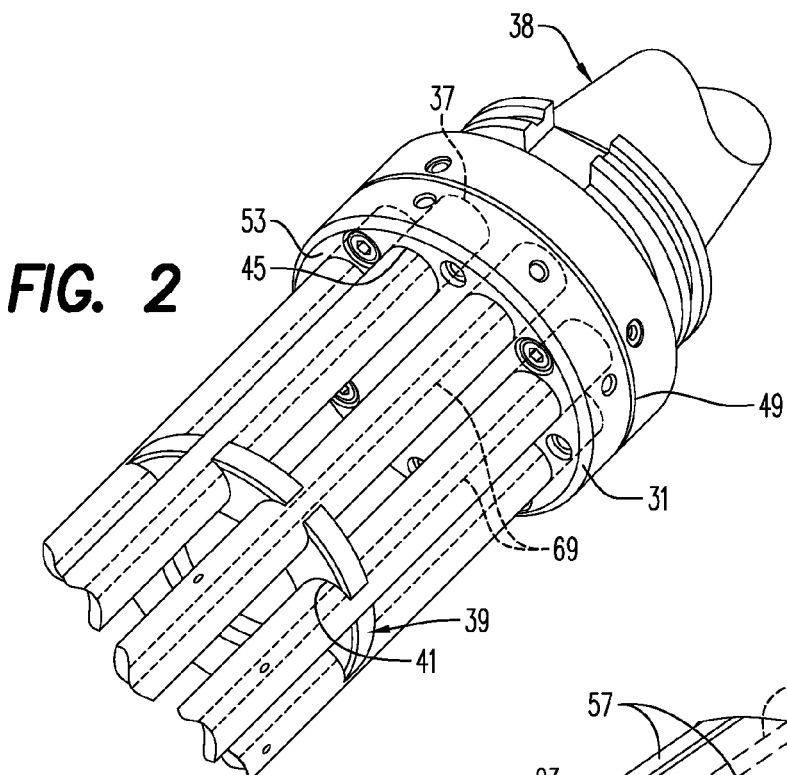
FIG. 2 is a view of a coupling attached to a rotating tool according to an embodiment of the present invention.

The second disk 31 can comprise a coupling member, such as a shank, for attachment to, e.g., a chuck (not shown) of a machine for rotating the tool and moving the tool axially. In FIG. 2, the second disk 31 is bolted to a discrete coupling member 38 that is attachable to a chuck.

The support 25 can comprise one or more intermediate disks 39 between the first and second disks 27 and 31. Each intermediate disk 39 can comprise openings 41 through which the plurality of elongated members 23 extend. The first disk 27 and the second disk 31 will ordinarily also comprise openings 43 and 45, respectively, that extend from first sides 47 and 49 of the first and second disks to second sides 51 and 53 of the first and second disks, with each elongated member 23 extending through a corresponding one of the openings.

Each disk 27, 31, and 39 may have one or more, ordinarily a plurality of, radial openings 55. Each of the radial openings 55 can be open to a radial edge of the respective disk 27, 31, and 39, and will ordinarily correspond to an opening 41, 43, or 45. Guiding pads 57 can extend outwardly from each radial opening 55 beyond a circumferential surface of the disk 27, 31, or 39 to facilitate guiding the tool in a hole being reamed. Often, guiding pads 57 will only be provided to extend out from the first disk 25 as well as certain intermediate disks 39 close to the first disk and portions of the elongated members 23 near the first disk as these disks and portions of the elongated members are most likely to be disposed in a hole being reamed. The guiding pads 57 will typically be mounted on the elongated members 23, however, guiding pads can be mounted directly to the disks 27, 31, or 39. The guiding pads 57 can be mounted on the elongated members 23 in recesses 58 in the elongated members and can be brazed to the elongated members.

A cutting edge 59 extends from at least one of the elongated members 23. Cutting edges can also or alternatively extend from a support 25. Typically, the cutting edge 59 is formed on a removable cutting insert 61 that is mounted to the at least one of the elongated members 23 in a pocket 63 formed in the elongated member. The position of the cutting edge 59 relative to the elongated members 23 can be adjustable, such as by mounting inserts 61 on the elongated members using mounting systems such as the BIFIX or PRECIFIX systems available from Seco Tools AB, Fagersta, Sweden.

Figure 3:
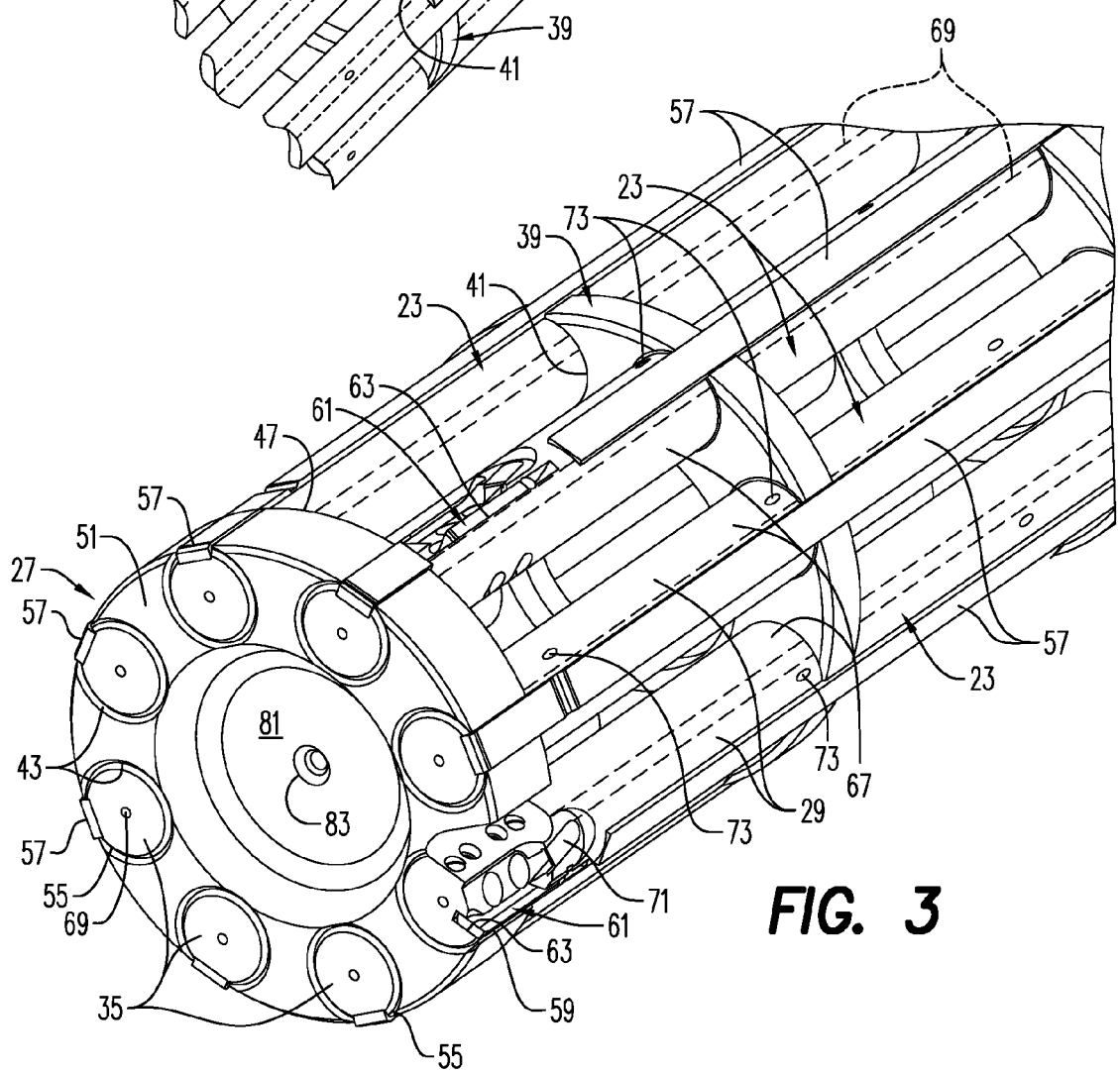
FIG. 3 is a view of a forward end of a rotating tool according to an embodiment of the present invention.

Ordinarily, a cutting edge 59 extends axially from a tip 35 of at least one of the elongated members 23, as seen, for example, in FIGS. 1 and 3. The first disk 27 has a recess 65 in the disk in front of the cutting edge 59 in a direction of rotation of the tool. The recess 65 forms a chiproom in which chips can be formed and from which they can flow away from the front of the tool 21 to behind the first disk 27. A cutting edge 59 ordinarily also extends radially from a side 67 of at least one of the elongated members 23. The cutting edge 59 extending from the tip 35 of the elongated member 23 and the cutting edge extending from the side 67 of the elongated member may be formed on the same cutting insert 61 and extend from the same elongated member, however, ordinarily, different cutting edges on different elongated members will extend from the tip and the sides. A cutting edge 59 at the tip 35 of an elongated member 23 may also extend from the side of the elongated member, however, a cutting edge remote from the tip may merely extend from the side of the elongated member.

At least one of the elongated members 23 can comprise an internal passage 69. The internal passage 69 can be used for conveying cooling and/or lubricating fluid toward the forward end of the tool 21. A channel 71 can extend from the internal passage 69 to an exterior of the elongated member 23 proximate a cutting edge 59 and, in this way, facilitates cooling and/or lubricating of the cutting edge and the workpiece. Another channel 73 can extend from the internal passage 69 to an exterior of the at least one of the elongated members proximate a guiding pad 57 and, in this way, facilitates cooling and/or lubrication of the guiding pad and the workpiece contacted by the guiding pad.

Figure 4:
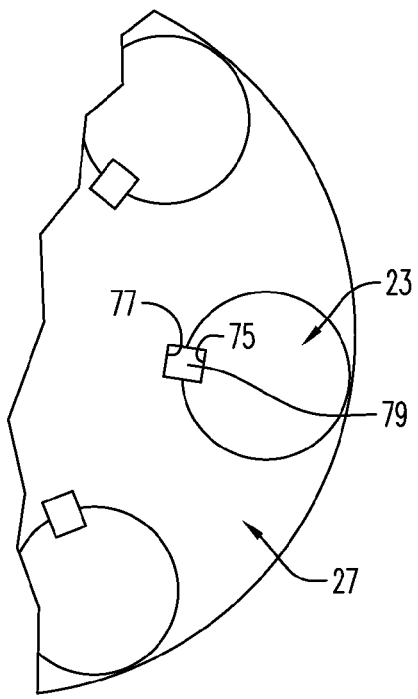
FIG. 4 is a cross-sectional view of a rotating tool according to an embodiment of the present invention.

The elongated members 23 and the support 25 will ordinarily have some form of arrangement for ensuring proper orientation of the elongated members relative to the support. For example, the elongated members 23 and the disks 27, 31, 39 can have recesses for receiving a key that ensures proper orientation of the elongated members relative to the disks. FIG. 4 shows an elongated member 23 and, for purposes of illustration, a first disk 27 with keyways 75 and 77, respectively, each of which receive part of a key 79. Other arrangements for properly orienting the elongated members 23 relative to the support 25 can be provided, such as by providing the elongated members with a non-circular external shape that matches an opening having a non-circular shape in the disks.

The first disk 27 can be provided with a central open or recessed area 81. The central open or recessed area can facilitate removal of chips from the forward end of the tool 21. Additionally, cooling and/or lubricating fluid that flows to the front of the tool 21 through the internal passages 69 in the elongated members 23 can be removed through an open area 81 or an opening 83 in a recessed area 81.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is desirable to provide a light weight rotating tool. In accordance with an aspect of the present invention, a rotating tool comprises a plurality of elongated members, and a support for holding the elongated members relative to an axis of rotation of the tool, wherein a guiding pad extends from at least one of the elongated members.

While this invention has been illustrated and described in accordance with a preferred embodiment, it is recognized that variations and changes may be made therein without departing from the invention as set forth in the claims.

The disclosures in Swedish patent application No. 0950110-7, from which this application claims priority, are incorporated herein by reference.

What is claimed is:

1. A rotating tool, comprising:
a plurality of elongated members, a cutting edge extending from at least one of the elongated members; and
a support attached to each of the elongated members for holding the elongated members at a distance relative to an axis of rotation of the tool so that the elongated members are disposed at respective positions on a circle around the axis, wherein a guiding pad arranged to facilitate guiding the tool in a hole being formed by the tool extends radially outwardly from the axis relative to at least one of the elongated members, wherein the support comprises a first disk to which first ends of the plurality of elongated members are attached and a second disk to which second ends of the plurality of elongated members are attached, the first and second disk having a plurality of axially extending openings in which the first and second ends, respectively, of the plurality of elongated members are received, wherein the cutting edge is formed on a removable cutting insert that is removably mounted to the at least one of the elongated members.

2. The rotating tool as set forth in claim 1, wherein the support comprises at least one intermediate disk between the first and second disks, the at least one intermediate disk comprising openings through which the plurality of elongated members extend.

3. The rotating tool as set forth in claim 1, wherein the cutting edge extends axially from a forward end of at least one of the elongated members.

4. The rotating tool as set forth in claim 3, wherein the plurality of openings in at least one of the first and the second disk extend from a first side of the disk to a second side of the disk, each elongated member extending through a corresponding one of the openings.

5. The rotating tool as set forth in claim 4, comprising a recess in the disk in front of the cutting edge in a direction of rotation of the rotating tool.

6. The rotating tool as set forth in claim 1, wherein the cutting edge extends radially from a side of at least one of the elongated members.

7. A rotating tool, comprising:
a plurality of elongated members, a cutting edge extending from at least one of the elongated members; and
a support attached to each of the elongated members for holding the elongated members at a distance relative to an axis of rotation of the tool so that the elongated members are disposed at respective positions on a circle around the axis, wherein a guiding pad arranged to facilitate guiding the tool in a hole being formed by the tool extends radially outwardly from the axis relative to at least one of the elongated members, wherein the support comprises a first disk to which first ends of the plurality of elongated members are attached and a second disk to which second ends of the plurality of elongated members are attached, the first and second disk having a plurality of axially extending openings in which the first and second ends, respectively, of the plurality of elongated members are received, wherein the cutting edge is formed on a removable cutting insert that is mounted to the at least one of the elongated members, wherein the support comprises a disk having a plurality of radial openings, each of the radial openings being open to a radial edge of the disk, and wherein a pad extends outwardly from each radial opening beyond a circumferential surface of the disk.

8. A rotating tool, comprising:
a plurality of elongated members, a cutting edge extending from at least one of the elongated members; and
a support attached to each of the elongated members for holding the elongated members at a distance relative to an axis of rotation of the tool so that the elongated members are disposed at respective positions on a circle around the axis, wherein a guiding pad arranged to facilitate guiding the tool in a hole being formed by the tool extends radially outwardly from the axis relative to at least one of the elongated members, wherein the support comprises a first disk to which first ends of the plurality of elongated members are attached and a second disk to which second ends of the plurality of elongated members are attached, the first and second disk having a plurality of axially extending openings in which the first and second ends, respectively, of the plurality of elongated members are received, wherein the cutting edge is formed on a removable cutting insert that is mounted to the at least one of the elongated members, wherein at least one of the elongated members comprises an internal passage.

9. The rotating tool as set forth in claim 8, wherein a channel extends from the internal passage to an exterior of the at least one of the elongated members proximate a cutting edge on the at least one of the elongated members.

10. The rotating tool as set forth in claim 8, wherein a channel extends from the internal passage to an exterior of the at least one of the elongated members proximate a guiding pad on the at least one of the elongated members.

\* \* \* \* \*